June 14, 1960 G. BROUSSAUD 2,941,165

SWITCHING DEVICES FOR ULTRAHIGH FREQUENCY WAVES

Filed June 18, 1958 4 Sheets-Sheet 1

June 14, 1960 G. BROUSSAUD 2,941,165

SWITCHING DEVICES FOR ULTRAHIGH FREQUENCY WAVES

Filed June 18, 1958

4 Sheets-Sheet 2

June 14, 1960 G. BROUSSAUD 2,941,165

SWITCHING DEVICES FOR ULTRAHIGH FREQUENCY WAVES

Filed June 18, 1958 4 Sheets-Sheet 4

United States Patent Office 2,941,165

Patented June 14, 1960

2,941,165

SWITCHING DEVICES FOR ULTRAHIGH FREQUENCY WAVES

Georges Broussaud, Paris, France, assignor to Compagnie Generale de Telegraphie Sans Fil, a corporation of France Filed June 18, 1958, Ser. No. 742,773

Claims priority, application France June 28, 1957

5 Claims. (Cl. 333—7)

The present invention relates to ultrahigh frequency switches.

It is often required in ultrahigh frequency techniques to direct selectively a guided ultrahigh frequency wave into any one of a plurality of wave guide channels.

Many mechanical systems have been devised to this end. All of such systems operate with a certain inherent inertia which renders them unappropriate when high repetition frequency switching is desired.

The present invention has as an object the providing of a switching device capable of switching wave energy as indicated above while eliminating inertia by, for example, avoiding the use of rotating mechanical elements.

The device according to the invention makes use of the properties of ferrite gyrators for rotating the polarization of a rectilinearly polarized wave according to a predetermined cycle, through different predetermined angles; a separator device being adapted for switching the waves to different channels, the polarization of the waves being rotated through said different angles.

The invention will be best understood from the following description and appended drawing wherein.

Figure 1:
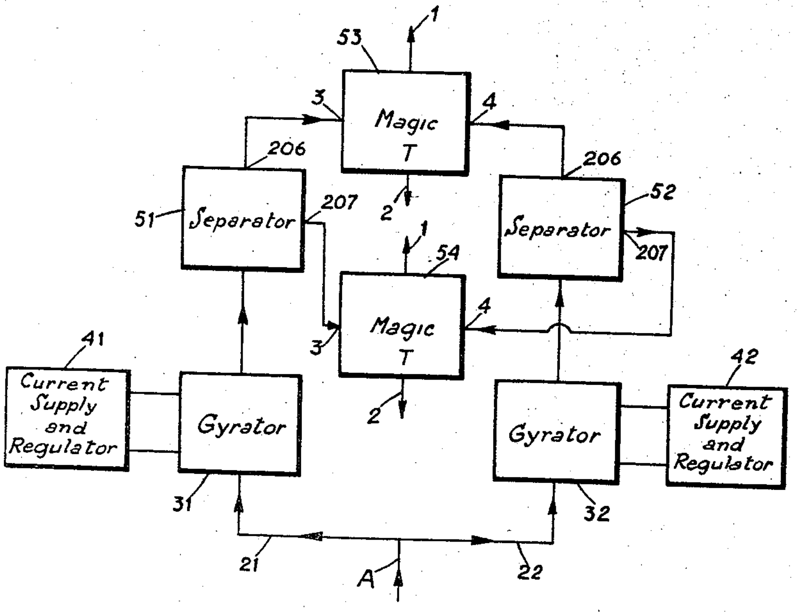
Fig. 1 is a block diagram of a four-channel switching device according to the invention.
Figures 3, 5:
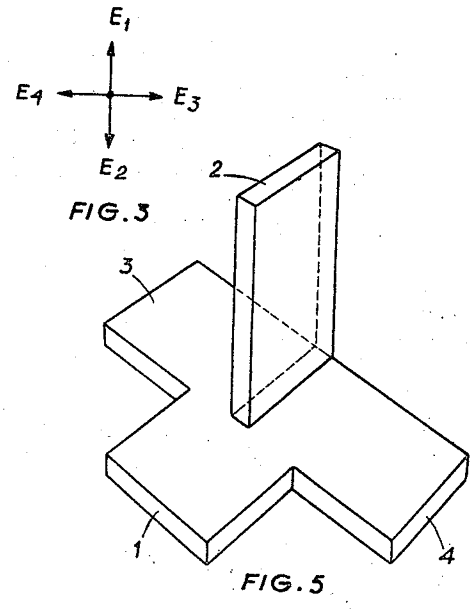
Fig. 3 is a diagram explanatory of the operation of the device shown in Fig. 1.
Figure 4:
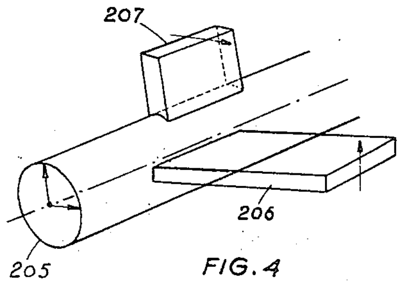
Figure 10:
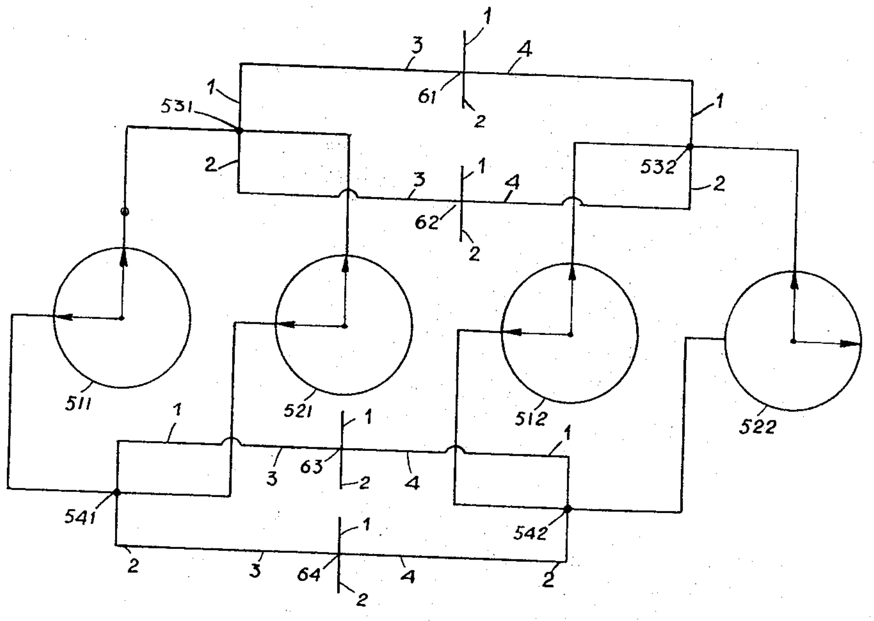
Figure 11:
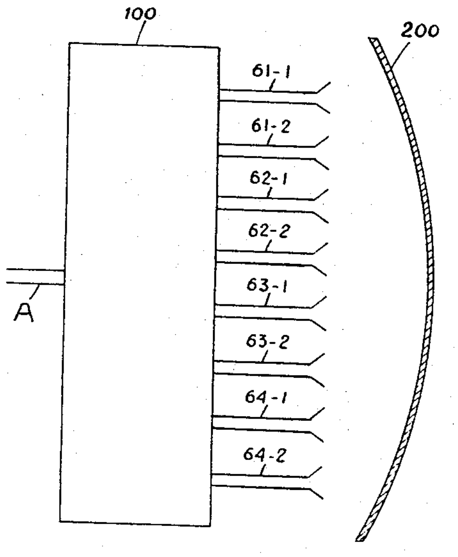

Fig. 4 diagrammatically shows a separator device used in Fig. 1;

Fig. 5 shows a hybrid or magic T also used in the circuit of Fig. 1;

Figs. 6, 7, 8 and 9 are explanatory diagrams relative to the operation of the system shown in Fig. 1;

Fig. 10 shows in a very diagramamtic manner an eight-channel switching device according to the invention;

Fig. 11 shows, by way of example, an application of the device of Fig. 10; and

Figure 12:
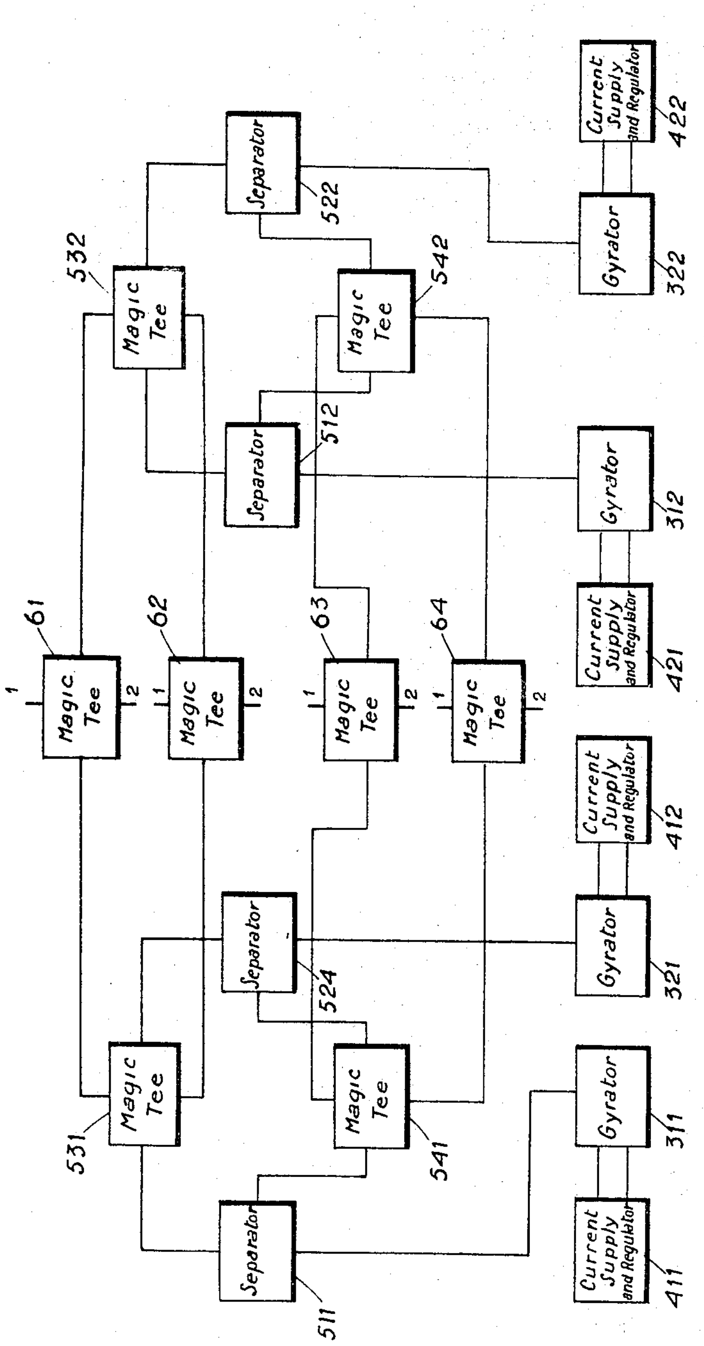

Fig. 12 is a block diagram of the eight channel device of Fig. 10.

Referring to Fig. 1, a rectilinearly (for example horizontally) polarized wave propagates in a guide A, which feeds at its two ends, respectively, two identical guides 21 and 22. Each of these guides receives one half of the energy fed to guide A with the same rectilinear polarization direction. Guides 21 and 22 are respectively coupled to the inputs of gyrator devices 31 and 32 which will later be described in more detail. They cause the polarization direction of the wave propagating therethrough to be rotated by an angle $$\alpha+n\frac{\pi}{2}$$

where $\alpha$ is constant and $n$ is a positive or negative integer selected at will. Gyrators 31 and 32 are respectively coupled to separator devices 51 and 52, which are in turn respectively coupled to the inputs of hybrid junctions 53 and 54.

The two respective pairs of outputs 1 and 2 of hybrid junctions 53 and 54 form the four output channels of a system provided in accordance with the invention and shown in Fig. 1.

Figure 2:
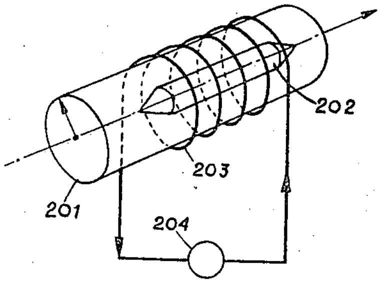
Fig. 2 illustrates diagrammatically a gyrator device used in the system of Fig. 1.

Fig. 2 shows an embodiment of gyrator device 31 or 32. It comprises a circular guide portion 201 along the axis of which is located a rod 202 of a resistive, ferromagnetic material, such as ferrite. A winding 203 fed from source 204 surrounds guide portion 201.

Upon current flow in winding 203, rod 202 is subjected to an axial magnetic field. It is known that any wave, having a rectilinear polarization directed along a vector E at the input of guide 201, will appear at the output thereof with a rectilinear polarization directed along a vector $E_1$. The angle $\theta$ between E and $E_1$, depends on the length of rod 202 and on the intensity of field H to which the latter is submitted. Thus, for a given rod length it is possible, by adjusting the current flow through winding 203, to obtain a predetermined value of angle $\theta$. According to the invention, the current intensity is adjusted to have $\theta$ equal to $$\alpha+n\frac{\pi}{2}$$

$\alpha$ being a constant, preferably equal to zero, and $n$ an integer, positive or negative. In the following description $n$ will be given the values 0, 1, 2, 3 or 4, as the case may be. Under these conditions, the wave at the output of device 31 or 32 is polarized according to one of the four directions represented in Fig. 3.

Fig. 4 shows one of the separator devices 51 or 52. It comprises circular guide portion 205 to which are coupled two similar rectangular guide portions 206 and 207 whose mean planes parallel to the large walls are in mutually perpendicular relationship, include the axis of guide 205 and contain vectors $E_3$, $E_4$ and $E_1$, $E_2$ respectively. Consequently, according to whether the polarization direction of the electric wave fields is $E_3$ or $E_4$ on the one hand, or $E_1$ or $E_4$ on the other, wave propagation occurs in guide 207. Guides 206 and 207 respectively couple separators 51 to one of the inputs, namely the input 3, of hybrid junctions 53 and 54 for instance of the hybrid or magic T type, such as that illustrated in Fig. 5. Each junction 53 or 54 comprises arms 1 and 2, and arms 3 and 4 perpendicular to the former and in prolongation of each other. As is well known, if wave energy enters arm 1, it is distributed between arms 3 and 4, the waves propagating in arms 3 and 4 being in phase at points equally distant from the common plane of symmetry of arms 1 and 2. If wave energy is fed to arm 2, it is again equally distributed between arms 3 and 4, but, the propagation in these arms is in phase opposition. Arms 1 and 2 always remain completely decoupled. Conversely, if arms 3 and 4 are energized in phase the whole of the energy is fed to arm 1, and none appears at the output of arm 2. If guides 3 and 4 are fed in phase opposition, the opposite takes place, all of the energy appearing at the output of arm 2 and none in arm 1.

The input and the output arms of the Tee's are identified by same reference numbers in all the figures.

Figures 6, 7, 8, 9:
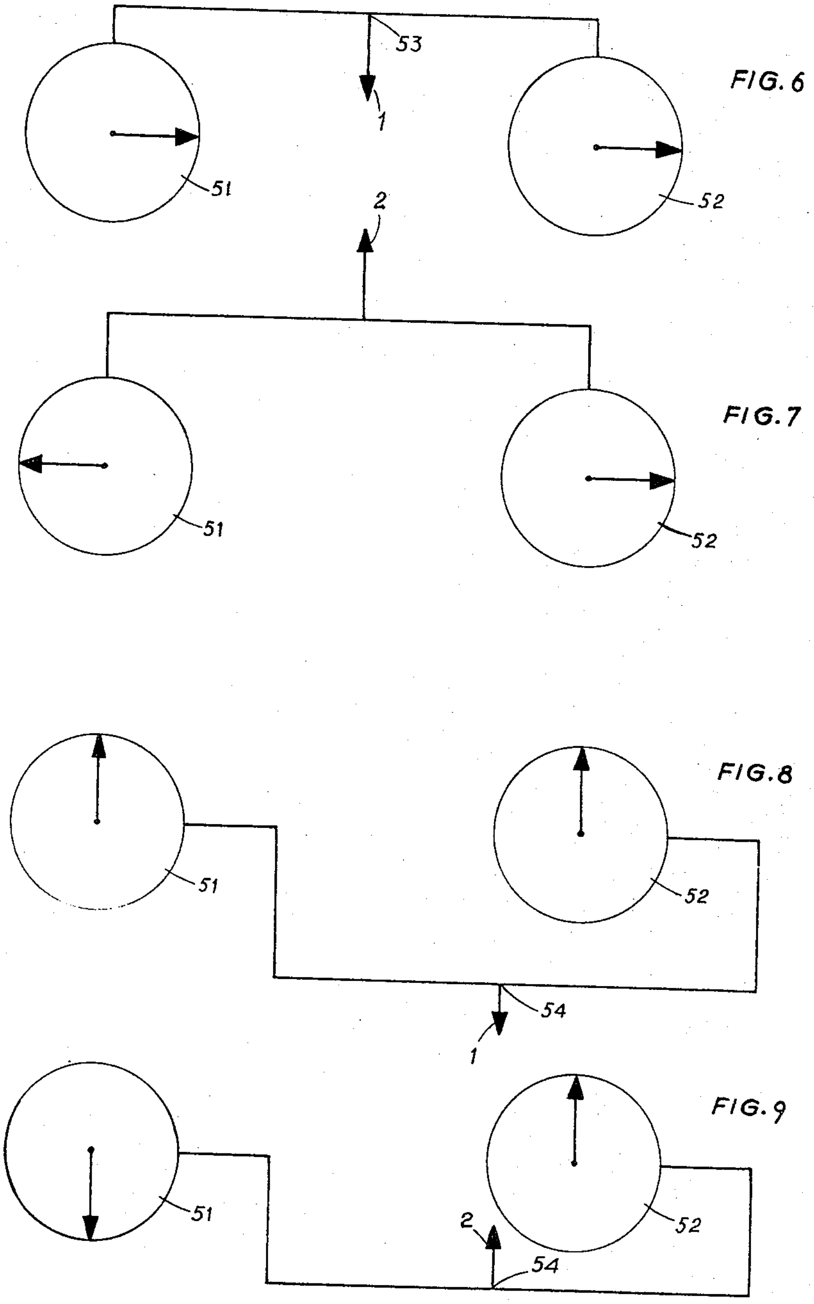

Figs. 6 to 9 diagrammatically show the direction of the wave energy. The wave energy is switched to appear at the respective output of Tee's 51 and 52 as a function of the polarization direction. The angle of the polarization direction at the respective outputs of separators 51 and 52 with the initial polarization direction will be designated by $\alpha_1$ and $\alpha_2$. Several cases can occur:

(a) $\alpha_1=\alpha_2=K\pi$ where K is an integer (Fig. 6).

In this case, wave energy is fed in phase to inputs 3 and 4 of T 53 and recombines in arm 1 thereof.

(*b*) $\alpha_1=K\pi, \alpha_2=(K+1)\pi$ (Fig. 7).

Wave energy is fed to T 53 and recombines in arm 2.

(c) $\alpha_1=\alpha_2=\frac{\pi}{2}+K\pi$ (Fig. 8)

Wave energy is fed to T 54 and the output is effected through arm 1 thereof.

(d) $\alpha_1=\frac{\pi}{2}+K\pi,\ \alpha_2=\frac{\pi}{2}+(K+1)\pi$

Wave energy is fed to T 54 and recombines in arm 2 thereof.

The described system has thus four output channels, each one becoming active for predetermined values of $\alpha_1$ and $\alpha_2$. By combining several similar switches, it is possible to increase the number of output channels. Fig. 10 shows how this can be achieved.

The switch of Fig. 10 and Fig. 12 comprises four gyrators of the type shown in Fig. 2, having a common input A, as shown in Fig. 11, and four polarization separators 511, 521, 512 and 522 fed, respectively by four gyrator devices 311—321, and 312—322. These gyrators are respectively controlled by devices 411, 412 and 421, 422. The four outputs of magic Tees 531 and 541 are the four outputs of a first switch identical to that shown in Fig. 1. In a similar way, the four outputs of magic Tees 532 and 542 correspond to the four outputs of a similar second switch.

Outputs 1 of T 531 and of T 532 respectively feed inputs 3 and 4 of a T 61 and outputs 2 thereof respectively feed inputs 3 and 4 of the same T. In the same way, outputs 1 and 2 of T 541 and of T 542 feed inputs 3 and 4 of a T 63 and a T 64.

The respective outputs 1 and 2 of Tees 61, 62, 63, 64 are the eight output channels of the switch of Fig. 10, the operation of which is readily understood from the above.

Let $\alpha_1$, $\alpha_2$, $\alpha_3$, $\alpha_4$ be the angles formed by the polarization direction at the output of the various gyrators used in the device of Fig. 10 with the initial polarization direction.

Eight different situations can arise, only the first three of them being explained in detail, since the explanation is similar in the other cases:

(1) $\alpha_1=\alpha_2=\alpha_3=\alpha_4=0+K\pi$

Tees 531 and 532 are fed in phase and feed in phase, through their respective arms 1, arms 3 and 4 of T 61, the output taking place through arm 1 of this T.

(2) $\alpha_1=\alpha_2=K\pi;\ \alpha_3=\alpha_4=(K+1)\pi$

T 531 is fed in phase and T 532 is also fed in phase but in phase opposition relative to T 531. Accordingly Tees 531 and 532 feed in phase opposition through their arms 1, arms 3 and 4 or T 61, the output being effected through arm 2 of this T.

(3) $\alpha_1=\alpha_3=K\pi;\ \alpha_2=\alpha_4=(K+1)\pi$

Tees 531 and 532 are both fed in phase opposition. Accordingly they feed in phase, through their respective arms 3 and 4 of T 62; the output taking place through arm 1 of this T.

(4) $\alpha_1=\alpha_4=K\pi;\ \alpha_2=\alpha_3=(K+1)\pi$

The output takes place through arm 2 of T 61.

(5) $\alpha_1=\alpha_2=\alpha_3=\alpha_4=(K+1)\frac{\pi}{2}$

The output is effected through arm 1 of T 63.

(6) $\alpha_1=\alpha_2=(K+1)\frac{\pi}{2};\ \alpha_3=\alpha_4=(K+3)\frac{\pi}{2}$ The output is effected through arm 2 of T 63.

(7) $\alpha_1=\alpha_3=(K+1)\frac{\pi}{2};\ \alpha_2=\alpha_2=(K+3)\frac{\pi}{2}$ The output takes place through arm 1 of T 64.

(8) $\alpha_1=\alpha_4=(K+1)\frac{\pi}{2};\ \alpha_2=\alpha_3=(K+3)\frac{\pi}{2}$ The output takes place through arm 2 of T 64.

It will be apparent that only the eight above combinations may be used. Other combinations are obviously also possible. However the respective outputs of Tees 531 and 532 on the one hand and 541, 542 on the other do not feed the same magic T 61 to 64. Such combinations may therefore not be used.

By combining two switches such as the one illustrated in Fig. 10, it is possible to switch the energy at will between 16 channels. More generally, by using $2^{n-1}$ ferrite gyrators with associated separators and Tees $2^n$ channels can be switched.

Of course, current regulators diagrammatically shown by blocks 41 and 42 in Fig. 1 must be provided for feeding to respective coils 203 of the gyrators 31 and 32 the currents necessary for rotating the polarization direction of the field energy fed to separators 511, 521, 512 and 522 by an angle equal to $$\frac{\pi}{2},\ \pi \text{ or } 3\frac{\pi}{2}$$

as the case may be. Also three different current supplies can be used.

The described systems are of an extremely simple construction since all the elements used, either active as the gyrators or passive as the magic Tees, are identical. Moreover, all these elements have a wide pass band and are capable of switching substantial amounts of wave energy, since all the ferrite elements are arranged in parallel and the energy passing through each one of them is equal to a fraction $$\frac{1}{2^{n-1}}$$

of the total output, the overall attenuation being equal to the attenuation due to a single gyrator.

It will be apparent that the system is entirely reciprocal. Referring by way of example to Fig. 1, if any given amount of wave energy is fed to input A to be collected at one of the output arms of T 53 or T 54, the same energy, upon being fed to one of these arms, will be available at A. This is due to the behaviour of the magic T devices and to the fact that the rotation angles due to the action of the ferrite gyrators are multiples of $\pi/2$.

Fig. 11 shows very diagrammatically and by way of example an application of the invention. A switch 100 is illustrated, having an input A and eight output arms corresponding to those shown in Fig. 10 and opening in the focal plane of a paraboloid reflector 200. This provides an aerial capable of rapidly scanning space for transmission and reception purposes, with reflector 200 remaining stationary.

Of course the invention is not limited to the embodiments described and shown, many variations being possible without departing from the spirit and the scope of the invention.

What is claimed is:

1. A switching device for ultrahigh frequency waves comprising in combination: $2^n$ identical wave guides having $2^n$ respective outputs, *n* being an integer, said guides having a common input; means for feeding to said common input a rectilinearly polarized wave; $2^n$ electrically controllable gyrator devices, respectively located at said respective outputs of said guides and having respective outputs; means for controlling said gyrators for rotating in said gyrators the polarization of the wave according to a predetermined cycle through angles differing by $$K\frac{\pi}{2}$$

K being an integer comprised between 0 and 4; and, respectively connected to said outputs of said gyrators, $2^n$ separator devices having respective inputs connected to said respective outputs of said gyrators and respectively a first and a second output arm, having respective broad walls, said broad walls of said first and said second outputs being in mutually perpendicular relationship; said separators being arranged by pairs; associated with each pair of said separator devices, a pair of hybrid junctions having respectively a first and a second input and a first and a second output; said first inputs of said pair of junctions being respectively connected to the first and the second outputs of one separator of the associated pair, said second inputs of said pair of junctions being respectively connected to the first and the second outputs of the other separator of the associated pair.

2. A switching device for an ultra high frequency wave comprising in combination: two identical wave guides having two respective outputs and a common input; means for feeding to said input a rectilinearly polarized wave; two electrically adjustable identical gyrator devices respectively located at said two outputs of said giudes and having respective output means for controlling said gyrators and rotating the vector of polarization of the wave according to a predetermined cycle through angles respectively equal to $$0, \frac{\pi}{2}, \pi, \frac{3\pi}{2} \text{ and } 2\pi$$

two separator devices having respective inputs connected to the respective outputs of said gyrator devices and having respectively a first and a second output for respectively collecting the wave, the polarization of which is rotated by 0 and $\pi$, and by $$\frac{\pi}{2} \text{ and } \frac{3\pi}{2}$$

said output arms having respective broad walls, the broad walls, of said first and said second arms being in mutually perpendicular relationship; a first and a second hybrid junction having respective first inputs connected to said first and said second output arms of one of said first separator device and respective second inputs respectively connected to said first and said second output arms of said second separator device; said hybrid junctions having respectively a first and a second output.

3. Switching device according to claim 2, wherein said gyrator devices are ferrite gyrators, comprising respectively a circular wave guide portion, a ferrite rod being located along the axis of said wave guide portion, and a winding surrounding said guide portion; a controllable electrical source feeding said winding, and means for controlling said electrical source.

4. Switching device according to claim 2, wherein said separator devices respectively comprise a circular wave guide portion coupled to said associated gyrator, and coupled to said guide portion, a first and a second rectangular wave guide including respectively large walls, the respective mean planes of said first and said second guide being parallel to said large walls and being in mutually perpendicular relationship.

5. Switching device having eight output channels, for ultrahigh frequency waves comprising in combination four identical wave guides having four respective outputs and having a common input; means for feeding to said common input a rectilinearly polarized wave; four electrically controllable gyrator devices having inputs respectively located at said respective outputs of said guides, and having respective outputs, means for controlling said gyrators for rotating in said gyrators the polarization of the wave according to a predetermined cycle, through angles equal respectively to $$0, \frac{\pi}{2}, \pi, \frac{3\pi}{2} \text{ and } 2\pi$$

and having respective inputs respectively connected to said respective outputs of said gyrators, four separator devices respectively associated by pairs, each having a first and a second output arms, said output arms having respective broad walls, the broad walls of said first and said second output arms being in mutually perpendicular relationship, respectively feeding the wave, the polarization of which is rotated through 0 or $\pi$, and $$\frac{\pi}{2} \text{ or } \frac{3\pi}{2}$$

and respectively associated with each pair of separator devices, a first and a second hybrid junction having respectively a first and a second input and output; said first inputs of said first and second hybrid junctions being connected respectively to said first and said second outputs of said first separator of the pair, and said second inputs to said first and second outputs of said second separators of the pair; two hybrid junctions for respectively interconnecting said first outputs and said second outputs of said first junction of each pair; and two hybrid junctions for respectively interconnecting said first and said second outputs of said second junctions of each pair, said four hybrid junctions having outputs which are respectively the eight channels of the switch.

References Cited in the file of this patent

UNITED STATES PATENTS

| | | |
|---|---|---|
| 2,766,430 | Zaleski | Oct. 9, 1956 |
| 2,809,354 | Allen | Oct. 8, 1957 |
| 2,818,501 | Stavis | Dec. 31, 1957 |
| 2,850,701 | Fox | Sept. 2, 1958 |